(12) United States Patent
Wu et al.

(10) Patent No.: US 12,316,922 B2
(45) Date of Patent: *May 27, 2025

(54) INTERACTION METHOD AND APPARATUS, AND ELECTRONIC DEVICE (71) Applicant: BEIJING BYTEDANCE NETWORK TECHNOLOGY CO., LTD., Beijing (CN)

(72) Inventors: Anni Wu, Beijing (CN); Xiaolin Li, Beijing (CN); Hongyu Yang, Beijing (CN); Yupeng Chen, Beijing (CN); Yingjie Sun, Beijing (CN); Panyi Yang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,931

(22) Filed: Nov. 20, 2023

(65) Prior Publication Data
US 2024/0089551 A1 Mar. 14, 2024

Related U.S. Application Data (63) Continuation of application No. 17/887,077, filed on Aug. 12, 2022, now Pat. No. 11,863,835, which is a (Continued)

(30) Foreign Application Priority Data
Jul. 31, 2020 (CN) .......................... 202010764798.2

(51) Int. Cl.
H04N 21/485 (2011.01)
H04N 21/258 (2011.01)
H04N 21/472 (2011.01)

(52) U.S. Cl.
CPC ... *H04N 21/4854* (2013.01); *H04N 21/25825* (2013.01); *H04N 21/47217* (2013.01)

(58) Field of Classification Search
None
See application file for complete search history.

(56) References Cited

U.S. PATENT DOCUMENTS

| 11,863,835 B2 | 1/2024 | Wu et al. |
| 2019/0306561 A1 | 10/2019 | Xu et al. |

(Continued)

FOREIGN PATENT DOCUMENTS

| CN | 101576996 A | 11/2009 |
| CN | 101616281 A | 12/2009 |

(Continued)

OTHER PUBLICATIONS

International Patent Application No. PCT/CN2021/109648; Int'l Search Report; dated Oct. 28, 2021; 3 pages.

(Continued)

*Primary Examiner* — Heather R Jones
(74) *Attorney, Agent, or Firm* — BakerHostetler (57) ABSTRACT

An interaction method, an interaction apparatus, and an electronic device are provided. The method includes: determining, in response to detecting a predefined size transformation operation, target transformation information of a target video based on whether a current size of the target video is a preset anchor point size, where the target video is a video played in a video play area; and transforming the target video based on the target transformation information, and playing the transformed target video.

20 Claims, 5 Drawing Sheets

Determine, in response to detecting a predefined size transformation operation, target transformation information of a target video based on whether a current size of the target video is a preset anchor point size — 101

Transform the target video based on the target transformation information, and play the transformed target video — 102

Related U.S. Application Data continuation of application No. PCT/CN2021/109648, filed on Jul. 30, 2021.

(56) References Cited

U.S. PATENT DOCUMENTS

| | | |
|---|---|---|
| 2020/0014961 A1 | 1/2020 | Ramaswamy et al. |
| 2022/0256099 A1 | 8/2022 | Feng |

FOREIGN PATENT DOCUMENTS

| | | | | |
|---|---|---|---|---|
| CN | 102890603 A | | 1/2013 | |
| CN | 102890816 A | * | 1/2013 | |
| CN | 107741815 A | | 2/2018 | |
| CN | 110446110 A | | 11/2019 | |
| CN | 110944186 A | * | 3/2020 | ........... H04N 19/167 |
| CN | 111031398 A | | 4/2020 | |
| CN | 111147911 A | | 5/2020 | |
| CN | 111355998 A | | 6/2020 | |
| CN | 111935544 A | | 11/2020 | |
| JP | 2003-108976 A | | 4/2003 | |
| WO | WO 2017/184241 A1 | | 10/2017 | |

OTHER PUBLICATIONS

European Patent Application No. 21850635.0; Partial Supplementary Search Report; dated Nov. 7, 2023; 59 pages.
European Patent Application No. 21850635.0; Extended Search Report; dated Feb. 8, 2024; 14 pages.
Communication pursuant to Article 94(3) EPC for European Application No. 21850635.0, mailed Nov. 6, 2024, 9 pages.

* cited by examiner

INTERACTION METHOD AND APPARATUS, AND ELECTRONIC DEVICE

CROSS REFERENCE TO RELATED APPLICATION

The present application is a continuation of U.S. patent application Ser. No. 17/887,077, filed on Aug. 12, 2022, which is a continuation of International Patent Application No. PCT/CN2021/109648, filed on Jul. 30, 2021, which claims priority to Chinese Patent Application No. 202010764798.2, titled "INTERACTION METHOD AND APPARATUS, AND ELECTRONIC DEVICE", filed on Jul. 31, 2020, all of which are incorporated herein by reference in their entireties.

TECHNICAL FIELD

The present disclosure relates to the field of computer technology, and in particular, to an interaction method, an interaction apparatus, and an electronic device.

BACKGROUND

With the development of computer technology, people may use computers to implement various functions. For example, people may use terminal devices to watch videos. When watching a video, it is sometimes necessary to adjust a display size of a video picture. How to adjust the display size of the video picture is one of the problems that need to be solved at present.

SUMMARY

This summary is provided to introduce concepts in a simplified form, the concepts are described in detail in the detailed description of the embodiments below. This summary is not intended to identify key features or essential features of the claimed technical solution, nor is it intended to be used to limit the scope of the claimed technical solution.

In a first aspect, an interaction method is provided according to an embodiment of the disclosure. The method includes: determining, in response to detecting a predefined size transformation operation, target transformation information of a target video based on whether a current size of the target video is a preset anchor point size, where the target video is a video played in a video play area; and transforming the target video based on the target transformation information, and playing the transformed target video.

In a second aspect, a video transformation method is provided according to an embodiment of the disclosure. The method includes: packaging a first layer into a second layer, where a target video in the second layer has the same play progress as a target video in the first layer, and a layer corresponding to a player is the first layer; and transforming the target video in the second layer based on a predefined transformation operation.

In a third aspect, an interaction apparatus is provided according to an embodiment of the disclosure. The apparatus includes: a determining unit configured to determine, in response to detecting a predefined size transformation operation, target transformation information of a target video based on whether a current size of the target video is a preset anchor point size, where the target video is a video played in a video play area; and a transforming unit configured to transform the target video based on the target transformation information, and play the transformed target video.

In a fourth aspect, an interaction apparatus is provided according to an embodiment of the disclosure. The apparatus is applied to a first electronic device, the apparatus includes: a packaging module configured to package a first layer into a second layer, where a target video in the second layer has the same play progress as a target video in the first layer, and a layer corresponding to a player is the first layer; and a transforming module configured to transform the target video in the second layer based on a predefined transformation operation.

In a fifth aspect, an electronic device is provided according to an embodiment of the present disclosure. The electronic device includes one or more processors and a storage apparatus storing one or more programs. The one or more programs, when executed by the one or more processors, cause the one or more processors to perform the interaction method described in the above first aspect or the video transformation method described in the above second aspect.

In a sixth aspect, a computer-readable medium is provided according to an embodiment of the present disclosure. The computer-readable medium stores a computer program. The computer program, when executed by a processor, causes the processor to perform the interaction method described in the above first aspect or the video transformation method described in the above second aspect.

According to the interaction method, the interaction apparatus and the electronic device provided by the embodiments of the present disclosure, in response to detecting the predefined size transformation operation, the target transformation information of the target video may be determined based on whether the current size of the target video is the preset anchor point size. Therefore, in the size transformation operation, the user's requirement for scaling the preset anchor point size can be compatible, and the target video can be quickly transformed to a size commonly used by the user, thereby reducing user operations and improving an interaction efficiency. In addition, the target video picture in the video play area can meet the requirement of the user to obtain information, and an information acquisition efficiency of the user can be improved.

BRIEF DESCRIPTION OF THE DRAWINGS

With reference to the drawings and specific embodiments below, the above and other features, advantages and aspects of embodiments of the present disclosure become more apparent. Throughout the drawings, the same or similar reference numerals indicate the same or similar elements. It should be understood that the drawings are schematic, and components and elements are unnecessarily drawn in scale.

DETAILED DESCRIPTION OF THE EMBODIMENTS

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be understood that, steps described in the method embodiments of the present disclosure may be performed in different orders and/or performed in parallel. In addition, the method embodiments may include additional steps and/or the shown steps may be omitted. The scope of the present disclosure is not limited thereto.

Term "including" and variations thereof adopted herein is inclusive, that is "including but not limited to". The term "based on" means "at least partially based on". The term "an embodiment" means "at least one embodiment", and the term "another embodiment" means "at least one another embodiment". The term "some embodiments" means "at least some embodiments". Definitions of other terms are provided below.

It should be noted that, the terms "first" "second" and so on mentioned in the present disclosure are only used to distinguish different apparatuses, modules or units, rather than limit an order of functions performed by the apparatus, module or unit or limit interdependence.

It should be noted that, the terms "a" and "multiple" mentioned in the present disclosure are schematic rather than restrictive, and should be understood as "one or more" by those skilled in the art, otherwise explicitly illustrated in the context.

Names of messages or information interacted between multiple apparatuses in the embodiments of the present disclosure are illustrative rather than limit the scope of the message or information.

Figure 1:
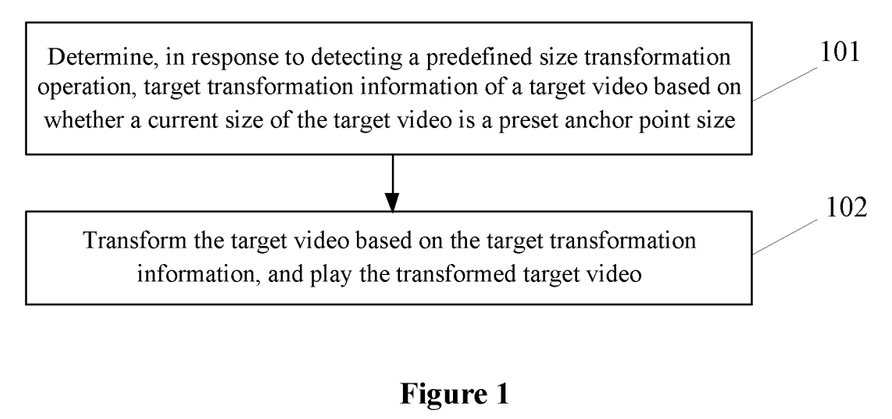
FIG. 1 is a flowchart of an interaction method according to an embodiment of the present disclosure.

Reference is made to FIG. 1, which is a flowchart of an interaction method according to an embodiment of the present disclosure. The interaction method is applied to a terminal device. As shown in FIG. 1, the interaction method includes the following steps 101 and 102.

Step 101, determine, in response to detecting a predefined size transformation operation, target transformation information of a target video based on whether a current size of the target video is a preset anchor point size.

In this embodiment, a first execution body (for example, a terminal device) of the interaction method may, in response to detecting the predefined size transformation operation, determine the target transformation information of the target video based on whether the current size of the target video is the preset anchor point size.

In this embodiment, the above-mentioned predefined size transformation operation may be a predefined operation, and the predefined operation may be used to perform size transformation on an image. The specific manner of the predefined transformation operation may be set according to the actual application scenario, which is not limited here.

In this embodiment, an implementation location of the above-mentioned predefined transformation operation may be in the video play area, or may be an area outside the video play area. The predefined transformation operation may also be implemented through voice control.

As an example, the above-mentioned predefined size transformation operation may include a two-finger operation. The two-finger operation may be visually understood as an operation performed by two fingers. Apparently, during specific operations, the user may use any part to simulate an effect of two fingers, to perform the two-finger operation. For example, increasing a distance between two fingers may be used as an enlarging operation; reducing the distance between two fingers may be used as a narrowing operation. In addition, the two fingers moving together with the distance between the two fingers remaining unchanged may be used as a moving operation, the moving operation can change the position of the target video, and not change the size of the target video.

In some application scenarios, one size transformation operation may be a process from a start operation to a release operation of the user. It can be understood that in one size transformation operation, one or more specific transformation operations may be implemented. For example, one size transformation operation may include an enlarging operation and a narrowing operation.

As an example, in a process of starting the size transformation operation, the user may first enlarge the target video, and then narrow the target video in a process of not releasing the size transformation operation. In this case, the above size transformation operation may include an enlarging operation type and a narrowing operation type. For example, the target transformation information may be determined based on the operation type first identified on the current video picture and whether a size of the current picture is the preset anchor point size. For example, in some embodiments, the current video picture is of an original video size, and an enlarging operation is detected on the current video picture, regardless of whether the operation has been released, the current video picture may be adjusted to a full-screen size.

In some embodiments, the operation type of the size transformation operation may be determined based on a vector between an operation position where the user starts the operation and an operation position where the user releases the operation. In other words, the user's operation trajectory in a process from start of the operation to release of the operation may not be used as a basis for determining the operation type.

As an example, the user may resize the target video. The current size of the target video is A, and the user may firstly enlarge the target video and then narrow target video to size B, where B is smaller than A. In a process of the user firstly enlarging the target video and then narrowing target video, the picture of the target video may be firstly enlarged and then be narrowed following the user's operation. When the user releases this operation, it may be determined that the operation type of this operation is a narrowing operation. Here, the target video is a video played in a video play area.

Here, the current size of the target video may be a size of the target video when the size transformation operation starts.

In this embodiment, the size transformation may include enlarging the size of the video.

In this embodiment, the size transformation may include narrowing the size of the video.

In some embodiments, translation may include moving the video picture in the video play area. Here, the preset anchor point size may be a preset common size. It should be noted that the size of the video may be continuously changed. The expression of the preset anchor point size some size may visually represent that some sizes in continuously changing sizes may be used as a fixed point for representing the common video size.

In some embodiments, the preset anchor point size may include, but is not limited to, at least one of an original image size and a full-screen image size. The preset anchor point size comprises at least one preset size.

Here, the above-mentioned original image size may be an original size of a video frame in the target video displayed on the terminal device.

Here, the full-screen image size may be the size of the target video in a max-screen play state on the terminal device. The max-screen play state, also known as a full-screen play state, usually refers to a state that the display size is larger than the original image size and can be maximized in the preset display area, for example, it may be a state where the video picture fills the video play area.

Here, the target transformation information of the target video may be information for transforming the target video. As an example, the target transformation information may indicate a transformation manner. The target transformation information corresponding to a free-scaling mode may be understood as transforming the current video size according to a scale of the user operation. As an example, the target transformation information may include, but is not limited to, at least one of a target transformation scale, a target transformation size.

Here, the target transformation scale may indicate a scale of transforming the current size, for example, transforming to twice the current size.

Here, the target transformation size may indicate a size to which the target video is expected to be transformed.

It should be noted that the size in this disclosure may be an absolute size or a relative size. In some application scenarios, the size (such as the anchor point size, the target video size) may also vary depending on the model. As an example, if a size of the original image is taken as the numerator, a ratio of other sizes to the size of the original image (i.e., the relative size) may also be referred to as the size in this disclosure.

Step 102, transform the target video based on the target transformation information, and play the transformed target video.

In this embodiment, the above-mentioned execution body may transform the target video based on the target transformation information, and play the transformed target video.

Here, the transformed target video may be played in the video play area.

In some application scenarios, a size of the video play area may change. For example, the size of the video play area may be a full screen size or a three-quarter screen size. In other words, the size of the video play area may switch between at least two sizes.

Figure 2:
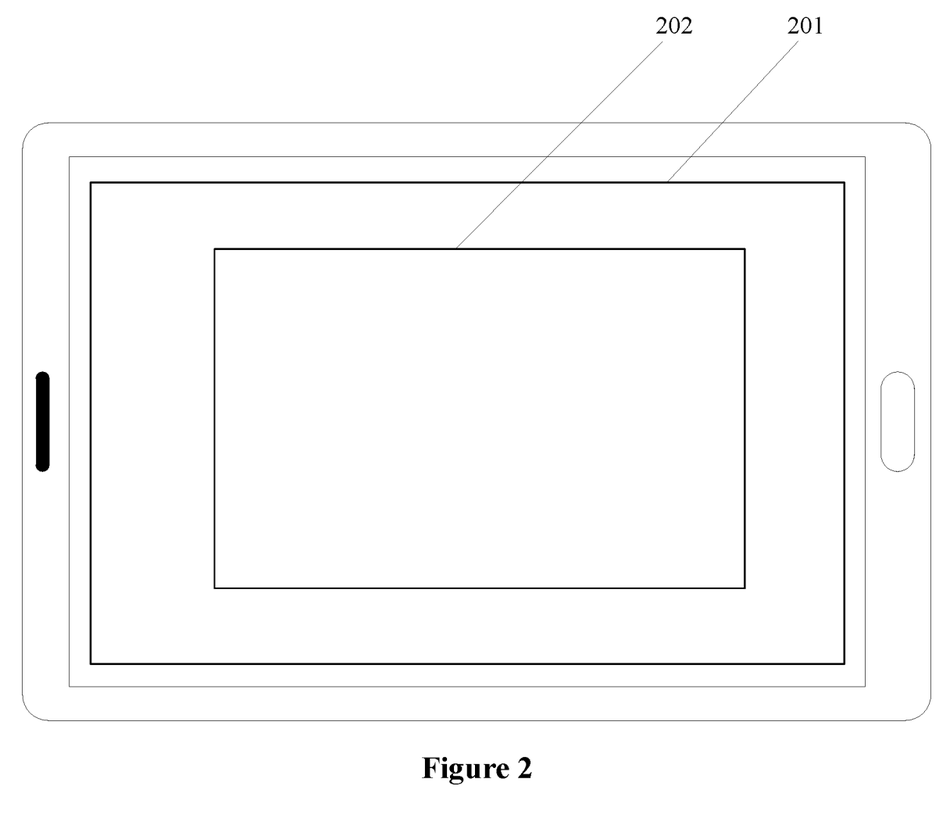
FIG. 2 is a schematic diagram of an application scenario of the interaction method according to the present disclosure.

As an example, reference is made to FIG. 2, the video play area 201 is a rectangle, and the target video picture 202 is also a rectangle. It can be understood that the horizontal side of the rectangle in FIG. 2 may be referred to as the length of the rectangle, the vertical side of the rectangle is referred to as the width of the rectangle. The target video picture may be understood as the target video displayed in the video play area.

It should be noted that, in FIG. 2, for the convenience of illustration, the image of the target video picture 202 is set to be much smaller than the image of the video play area 201.

In practical application scenarios, if the length of the target video is less than the length of the video play area and the width of the target video is less than the width of the video play area, the size of the target video picture may be set to be the same as the size of the target video.

In practical application scenarios, if the length of the target video is greater than the length of the video play area or the width of the target video is greater than the width of the video play area, the size of the target video image may be set to be the same as the size of the video play area. In other words, the target video picture is part of the video frame of the target video.

It should be noted that, according to the interaction method provided by the embodiments of the present disclosure, in response to detecting the predefined size transformation operation, the target transformation information of the target video may be determined based on whether the current size of the target video is the preset anchor point size. Therefore, in the size transformation operation, the user's requirement for scaling the preset anchor point size can be compatible, and the target video can be quickly transformed to a size commonly used by the user, thereby reducing user operations and improving an interaction efficiency. In addition, the target video picture in the video play area can meet the requirement of the user to obtain information, and an information acquisition efficiency of the user can be improved.

In some embodiments, the above method may include: moving, in response to detecting a predefined moving operation and in response to determining that the current size of the target video is greater than a size of the video play area, the target video in the video play area.

Here, the above predefined moving operation may be used for translating the target video. The specific implementation manner of the above predefined moving operation may be set according to an actual application scenario, which is not limited here.

As an example, the above predefined moving operation may be a dragging operation, and the number of triggering points between the human body and the screen when the drag operation is performed may not be limited. As an example, the above predefined moving operation may be a single-finger dragging operation, a two-finger dragging operation, or a three-finger dragging operation. Here, the current size of the target video is greater than the size of the video play area, which may be understood as the side length of the target video is greater than the side length of the video play area in at least one direction. Referring to FIG. 2, the length of the target video may be greater than the length of the video play area, or the width of the target video may be greater than the width of the video play area.

It should be noted that, through the predefined moving operation, the target video may be moved in the video play area, so that the user can move the desired viewing part to a convenient viewing position, thereby improving the information acquisition efficiency of the user.

As an example, when the user watches a beauty video, the user may pay attention to beauty products used by the blogger, and it is difficult to clearly view the beauty products when the video does not give a close-up of the product. Through the size transformation operation and/or moving operation provided in this disclosure, the video picture at the product can be enlarged, and the user can also move the video picture at the product to the middle position of the video play area, so that the beauty product information can be clearly viewed.

In some embodiments, the determining target transformation information of a target video based on whether a current size of the target video is a preset anchor point size includes: determining the target transformation information based on an operation type of the size transformation operation and the preset anchor point size.

In some embodiments, the determining the target transformation information based on an operation type of the size transformation operation and the preset anchor point size includes: using first target transformation information in response to the operation type and the preset anchor point size satisfying a first preset relationship, where the first target transformation information indicates that the size of the target video is switched between different preset anchor point sizes; and using second target transformation information in response to the operation type and the preset anchor point size satisfying a second preset relationship, where the second target transformation information corresponds to a free-scaling mode.

In some embodiments, the first preset relationship indicates that the operation type, the current size of the target video and the preset anchor point size satisfy a preset first correspondence or do not satisfy a preset second correspondence.

In some embodiments, the second preset relationship indicates that the operation type, the current size of the target video and the preset anchor point size do not satisfy the preset first correspondence or satisfy the preset second correspondence.

In some embodiments, the first preset relationship includes a case that the current size of the target video is an original image size, the operation type is an enlarging operation, and the target transformation information includes transforming the target video to a full-screen image size; and/or, a case that the current size of the target video is the full-screen image size, the operation type is a narrowing operation, and the target transformation information includes transforming the target video to the original image size.

In some embodiments, the second preset relationship includes a case that the current size of the target video is the original image size, the operation type is the narrowing operation, and the target transformation information includes freely scaling the target video based on operation information; and/or, a case that the current size of the target video is the full-screen image size, the operation type is the enlarging operation, and the target transformation information includes freely scaling the target video based on the operation information.

Here, the first target transformation information indicates to switch the size of the target video between different preset anchor point sizes.

Here, the second target transformation information corresponds to the free-scaling mode. In the free-scaling mode, the size of the target video may be continuously enlarged or narrowed according to the user operation. For example, the size of the target video is gradually enlarged when the distance between two touch points operated by the user becomes greater and greater, or the size of the target video is gradually narrowed when the distance between two touch points operated by the user becomes less and less.

In some embodiments, the above step 101 may include: determining, in response to determining that the current size is the preset anchor point size and in response to the operation type of the size transformation operation corresponding to the preset anchor point size, the preset transformation information corresponding to the preset anchor point size as the target transformation information.

Here, the operation type of the size transformation operation may include at least one of a narrowing operation and an enlarging operation.

Here, each preset anchor point size has corresponding preset transformation information and also has a corresponding operation type.

In some application scenarios, the free-scaling mode may be entered in response to determining that the current size is the preset anchor point size and in response to the operation type of the size transformation operation not corresponding to the preset anchor point size.

Here, the preset transformation information may be set according to an actual application scenario, which is not limited herein. The preset transformation information may be a preset transformation scale or a preset size.

It should be noted that by setting the correspondence between the preset anchor point size and the operation type and setting the correspondence between the preset anchor point size and the preset transformation information, when the target video has the anchor point size, the video picture can be quickly transformed to a common size, such as other preset anchor point sizes, by one corresponding operation, which avoids the need for the user to perform multiple operations to transform to a desired size, thereby reducing user operations and reducing computing resources and display resources consumed by user operations.

In some embodiments, the size transformation operation includes an enlarging operation, the preset anchor point size includes an original image size, and preset transformation information corresponding to the original image size indicates a full-screen image size, an operation type corresponding to the original image size is the enlarging operation.

Here, a case, that the preset transformation information corresponding to the original image size indicates the full-screen image size, may be understood as a case that the preset transformation information corresponding to the original image size may indicate transformation information for transforming the original image size to the full-screen image size.

Correspondingly, the determining, in response to determining that the current size is the preset anchor point size and in response to the operation type of the size transformation operation corresponding to the preset anchor point size, the preset transformation information corresponding to the preset anchor point size as the target transformation information may include: determining, in response to determining that the current size is the original image size and in response to detecting the enlarging operation in the video play area, the preset transformation information indicating the full-screen image size as the target transformation information.

It should be noted that, when the target video has the original image size, the target video can be adjusted to the full-screen image size by performing the enlarging operation. Thus, the number of user operations can be reduced, and the computing resources and display resources consumed by the user operations can be reduced.

In some embodiments, the size transformation operation includes a narrowing operation, the preset anchor point size includes a full-screen image size, and preset transformation information corresponding to the full-screen image size indicates an original image size, an operation type corresponding to the full-screen image size is the narrowing operation.

Here, a case, that preset transformation information corresponding to the full-screen image size indicates an original image size, may be understood as a case that the preset transformation information corresponding to the full-screen image size may indicate transformation information for transforming the full-screen image size to the original image size.

Correspondingly, the determining, in response to determining that the current size is the preset anchor point size and in response to the operation type of the size transformation operation corresponding to the preset anchor point size, the preset transformation information corresponding to the preset anchor point size as the target transformation information includes: determining, in response to determining that the current size is the full-screen image size and in response to detecting the narrowing operation in the video play area, the preset transformation information indicating the original image size as the target transformation information.

It should be noted that, when the target video has the full-screen image size, the target video can be adjusted to the original image size by performing the narrowing operation. Thus, the number of user operations can be reduced, and the computing resources and display resources consumed by the user operations can be reduced.

Figure 3:
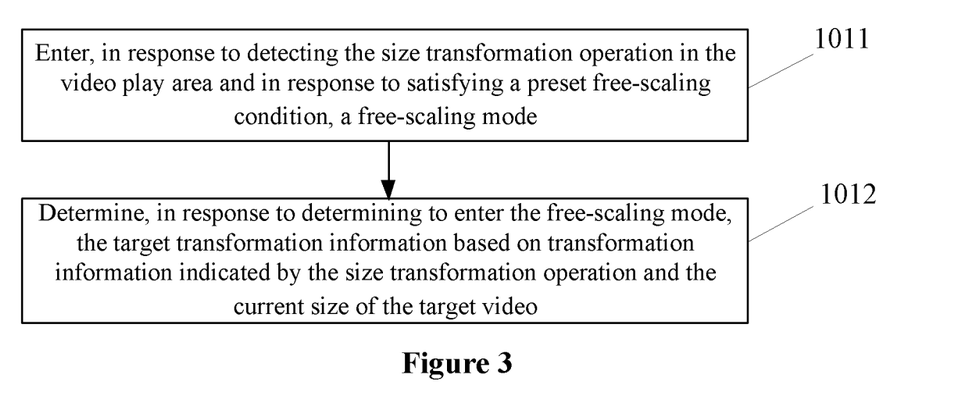
FIG. 3 is an optional implementation of step 101 of the interaction method according to the present disclosure.

In some embodiments, reference is made to FIG. 3, which is an optional implementation of above step 101. The flow shown in FIG. 3 may include steps 1011 and step 1012.

Step 1011, enter, in response to detecting the size transformation operation in the video play area and in response to satisfying a preset free-scaling condition, a free-scaling mode.

Step 1012, determine, in response to determining to enter the free-scaling mode, the target transformation information based on transformation information indicated by the size transformation operation and the current size of the target video.

In other words, in the free-scaling mode, the target transformation information may be determined based on the transformation information of the size transformation operation and the current size of the target video.

In some application scenarios, in the free-scaling mode, the size of the enlarged video image may be larger than the size of the screen during the target video is enlarged, in this case, only a part of the size of the enlarged video image can be displayed on the screen, other parts of the enlarged video image may be displayed by operations such as dragging the video image.

In some embodiments, the above-mentioned free-scaling condition includes at least one of: a case that the current size of the target video is not the preset anchor point size; and a case that an operation type of the size transformation operation does not correspond to the preset anchor point size.

As an example, on the basis that the target video has the original image size, the picture is narrowed to enter the free-scaling mode, that is, the video picture may be enlarged or narrowed freely.

As an example, on the basis that the target video has the full-screen image size, the picture is enlarged to enter the free-scaling mode, that is, the video picture may be enlarged or narrowed freely.

It should be noted that, by setting the above free-scaling condition, the user's usage scenario can be fitted and the user's switching requirements between free-scaling and anchor point size transformation can be met, thereby reducing the number of operations and operation time for the user to perform size transformation operations, and improving an operation efficiency.

In some embodiments, the free-scaling condition comprises a case that the current size of the target video is the preset anchor point size, and an operation type do not correspond to the preset anchor point size, wherein the operation type is indicated by the ratio of a real-time size of the target video when a size transformation operation is released to the current size of the target video.

In some application scenarios, as the size transformation operation is performed, the execution body may determine the real-time size of the target video in real time.

In some embodiments, before the size transformation operation is released, a size of the target video is transformed in real time based on the transformation information indicated by the size transformation operation. In other words, as the size transformation operation is performed, the target video displayed on the screen may be enlarged or narrowed with the size transformation operation.

It should be noted that, a size transformation effect is displayed in real time based on the user's size transformation operation, a progress of the size transformation can be displayed to the user in time, so that the user can continue or terminate the size transformation operation according to the effect of real-time size transformation operation.

In some application scenarios, the real-time size may be used as the basis for determining a type of a user operation.

Here, if the ratio of the real-time size of the target video when the above-mentioned size transformation operation is released to the current size is greater than 1, it indicates an enlarging operation type. If the ratio of the real-time size of the target video when the above-mentioned size transformation operation is released to the current size is less than 1, it indicates a narrowing operation type.

It should be noted that using the real-time size when the operation is released as the basis for determining the type of the user operation can improve the accuracy of determining the operation type, thereby improving the accuracy of transformation. Specifically, the user watches the video in real time, and determines whether to release the size transformation operation according to the real-time screen. Therefore, the real-time size of the target video when the user releases the size transformation operation can more accurately reflect the user's expectations for the degree of size transformation.

In some embodiments, on the one hand, the target transformation information of the target video is determined by referring to whether the current size of the target video is the preset anchor point size, so as to be compatible with the transformation operations commonly used by users and meet the operation requirements of most users; on the other hand, by setting the trigger condition of the free-scaling mode, the free-scaling mode is triggered under certain conditions (such as receiving the enlarging operation when the picture has a full-screen size, or receiving the narrowing operation when the picture has an original image size, where the enlarging operation and the narrowing operation may real-time operation results or operation results when the operation is released), which can provide more precise scaling processing and meet further needs of some users. The integration of the above two aspects can meet different operation scenarios of a large number of users, maximize the operation efficiency and improve the experience.

In some embodiments, the above method may further include: displaying corresponding prompt information based on a scaling mode performed on the target video, where the prompt information is used to prompt the scaling mode.

Here, the display manner and content of the above-mentioned prompt information may be set according to the actual application scenario, which is not limited here.

As an example, the prompt information may be displayed in the form of a toast.

As an example, the scaling mode may indicate to adjust the size of the video picture to the full-screen image size, the corresponding prompt information may be "the size has be switched to full screen".

As an example, the scaling mode may indicate the free-scaling mode, and corresponding prompt information may be "entered the free-scaling mode".

As an example, the scaling mode may indicate to adjust the size of the video picture to the original image size, and the corresponding prompt information may be "restored to the original size".

In some embodiments, the displaying corresponding prompt information based on a scaling mode performed on the target video includes: in response to adjusting the target video to a full-screen image size, displaying first prompt information, where the first prompt information is used to indicate that the target video is in a full screen play state.

In some embodiments, the displaying corresponding prompt information based on a scaling mode performed on the target video includes: in response to adjusting the target video to the original image size, displaying second prompt information, where the second prompt information is used to indicate that the target video is in an original size playing state.

In some embodiments, the displaying corresponding prompt information based on a scaling mode performed on the target video includes: in response to determining that the free-scaling mode is entered, displaying third prompt information, where the third prompt information is used to indicate that the target video can be freely scaled based on the size transformation operation.

In some embodiments, the method further includes: displaying, in response to determining that a size of the transformed target video is not an original image size, a restore control, where the restore control is used for transforming the target video to the original image size.

In other words, if the video picture is of a non-original scale, a button marked "Restore Screen" may be displayed, and after clicking the "Restore Screen" button, the video picture may be switched back to the original image size. The original image size can be called the original display size, because the original image size is original display size when the image is play.

It should be noted that, by settings the restore control, the user can switch the video picture to the original image picture conveniently, and operations for the user to return to the original image picture can be reduced, that is, the interaction efficiency can be improved.

In some embodiments, the above method may further include: detecting, in response to end of the size transformation operation and/or a moving operation, whether the target video is moved out of the video play area; and correcting, in response to determining that the target video is moved out of the video play area, a video picture in the video play area, to obtain the target video picture that matches the size of the video play area.

Here, the determination of whether the target video is moved out of the video play area may be performed by setting specific determining conditions according to the actual application scenario. In some embodiments, if there is no picture in the video play area in a direction, but the target video also has images which are not being displayed along the direction, in this case, it may be understood that the target video is moved out of the video play area.

Here, the correction of the video picture may include operations such as translating the target video, and pulling the target video back to the video play area.

As an example, if the picture of the target video is moved out of the video play area, the target video may be pulled back to the video play area.

It should be noted that by setting a correction link, the occurrence of a case that the target video is moved out of the video play area can be reduced, and an information display efficiency can be improved.

Figure 4:
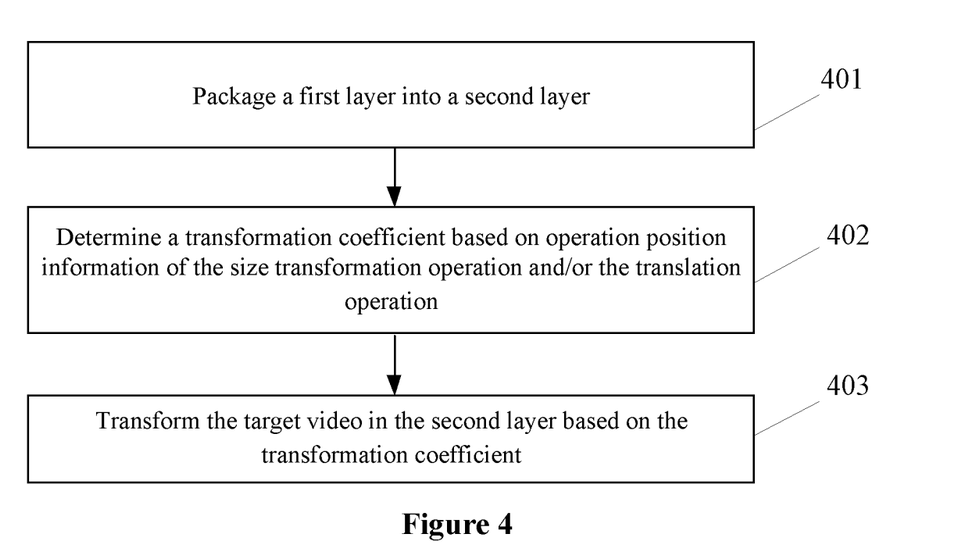
FIG. 4 is a flowchart of an interaction method according to another embodiment of the present disclosure.

The introduction of the embodiment of FIG. 4 can solve a further technical problem, that is, the problem that the video size transformation operation may cause confusion in the layout of the video play screen.

It should be noted that, the method provided in the embodiment of FIG. 4 may be applied to any transformation scenario of the target video involved in this disclosure. The method provided in the embodiment of FIG. 4 may be applied to a size transformation scenario and/or a translation scenario. The application to the size transformation scenario may include the application to the free-scaling scenario, or the application to the scenario where the size transformation is performed based on the preset transformation information.

Reference is made to FIG. 4, which is a flowchart of an interaction method according to another embodiment of the present disclosure. In the process shown in FIG. 4, the interaction method includes steps 401 and 403.

Step 401, package a first layer into a second layer.

In this embodiment, a first execution body (for example, a terminal device) of the interaction method may package the first layer into the second layer.

Here, the layer where the acquired target video is located is the first layer.

Usually, a player on a terminal may acquire the target video from a local or other electronic device. The target video parsed by the player is drawn on the layer, which may be displayed on the screen. In some application scenarios, the player may further include playing logic information to control the play of the video, for example, to control the switching of the video, to control the play progress, and so on.

Here, the layer corresponding to the player may be recorded as the first layer. Here, the layer corresponding to the player may be understood as the layer on which the video parsed by the player may be drawn.

Here, the target video in the second layer has the same play progress as the target video in the first layer.

Here, the second layer may be understood as a new layer packaged outside the first layer. The transformation of the second layer does not affect a play logic of the player. Moreover, the play progress of the second layer is the same as the play progress of the first layer. In other words, it may be understood as drawing the target video on the first layer onto the second layer.

In some application scenarios, the number of layers in the first layer may be one or more. If there are at least two layers in the first layer, the display content of each layer may be drawn to the second layer.

Here, the target video in the second layer is used for transformation based on the size transformation operation and/or a moving operation. In other words, after the second layer is packaged outside the first layer, the image displayed on the screen may be obtained from the second layer.

It should be noted that, the method provided in step 401 may be applied to the size transformation scenario and/or the translation scenario.

In some embodiments, the above-mentioned first execution body may transform the target video in the second layer by: determining a transformation coefficient based on operation position information of the size transformation operation and/or the moving operation, where the transformation coefficient includes at least one of size transformation information and a moving coefficient; and transforming the target video in the second layer based on the transformation coefficient.

Step 402, determine a transformation coefficient based on operation position information of the size transformation operation and/or the moving operation.

Here, the transformation coefficient includes at least one of the size transformation information and the moving coefficient.

Here, the above-mentioned predefined transformation operation may include, but is not limited to, at least one of the size transformation operation and the moving operation.

Here, the user may touch the screen, and the terminal converts a touch signal into a logical coordinate point. Then the terminal may calculate a change in the distance of the coordinate point when the finger slides, thereby calculating a displacement. The transformation information and/or the moving coefficient are then determined based on the displacement.

Step 403, transform the target video in the second layer based on the transformation coefficient.

It should be noted that the interaction method provided by the embodiment corresponding to FIG. 4 can package a new layer outside the layer corresponding to the player, and perform transformation on the new layer. In this way, video play and video transformation can be isolated to ensure that the video transformation does not affect the processing on the target video (including play, transformation, or the like) performed by the player. Therefore, it can be ensured that video play and video transformation are performed simultaneously, the interaction efficiency and the information display efficiency are improved, and the information acquisition efficiency of the user is also improved.

In some embodiments, the method may further include: acquiring a target video picture that matches the video play area from the target video in the second layer; and playing the target video picture that matches the video play area in the video play area.

Here, a preset area of the second layer may correspond to the video play area. The image in the preset area needs to be displayed in the video play area.

As an example, for the moving operation, coordinates of the image on the second layer may be translated, and it may be understood that in this case, the image in the preset area may be changed.

As an example, for the size transformation operation, the image on the second layer may be transformed, and it may be understood that in this case, the image in the preset area may be changed.

Here, no matter whether the image in the second layer is changed or not, the image displayed in the video play area may be obtained from the above-mentioned preset area.

In some application scenarios, the size of the video play area may be smaller than the size of the target video, and the video play area cannot display a complete picture of the target video. In this case, the acquired picture of the target video that matches the video play area may be displayed in the video play area as the target video picture.

Here, matching with the video play area may be determined by setting a matching determining condition according to actual application scenarios.

As an example, if the length of the target video is less than the length of the video play area and the width of the target video is less than the width of the video play area, a complete picture of the target video may be used as the target video picture matching the video play area.

As an example, if the user continues to enlarge the video size when the video size is the full-screen image size, the picture displayed on the screen is a part of the complete video picture. Therefore, it is necessary to acquire a part of the video picture that matches the video play area as the target video picture. The length of the target video picture may be the same as the length of the video play area, and the width of the target video picture may be the same as the width of the video play area.

It should be noted that, by obtaining the target video picture from the second layer, the video picture that matches the video play area can be obtained without changing the play logic of the player. For the user, playing and transforming the video can be performed at the same time, thereby improving the information display efficiency and improving the information acquisition efficiency of the user.

Figure 5:
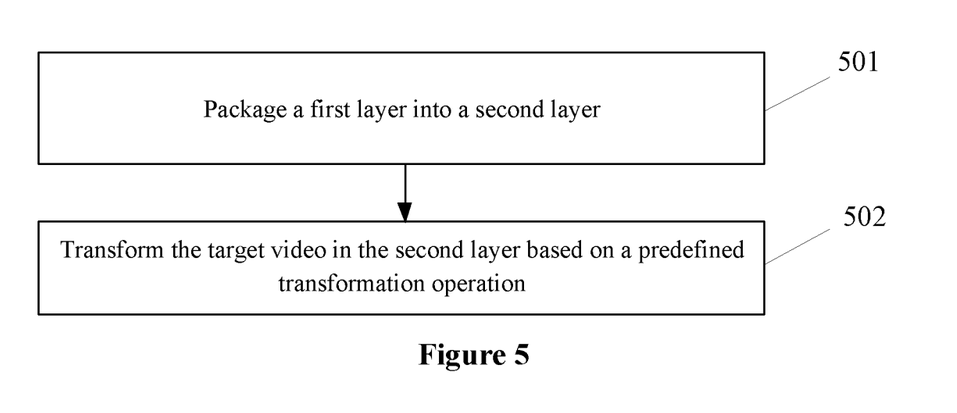
FIG. 5 is a flowchart of a video transformation method according to an embodiment of the present disclosure.

Reference is made to FIG. 5, which is a flowchart of a video transformation method according to an embodiment of the present disclosure. The method is applied to a terminal device. As shown in FIG. 5, the video transformation method includes the following steps 501 and 502.

Step 501, package a first layer into a second layer.

In this embodiment, a second execution body (for example, the first electronic device) of the interaction method may send a data forwarding request to a data forwarding device supporting a wireless network.

Here, a target video in the second layer has the same play progress as a target video in the first layer, and a layer corresponding to a player is the first layer.

Step 502, transform the target video in the second layer based on a predefined transformation operation.

In some embodiments, the above step 501 may include: determining a transformation coefficient based on operation position information of the predefined transformation operation, where the transformation coefficient includes at least one of size transformation information and a moving coefficient; and transforming the target video in the second layer based on the size transformation information and the moving coefficient.

In some embodiments, the above method may further include: acquiring a target video picture that matches the video play area from the target video in the second layer; and playing the target video picture that matches the video play area.

It should be noted that, in the interaction method provided by the embodiment corresponding to FIG. 5, for the implementation details and technical effects of each step, reference may be made to the description of the relevant part in this disclosure, and details are not repeated here.

Figure 6:
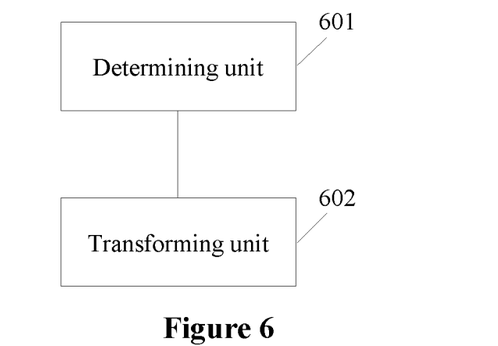
FIG. 6 is a schematic structural diagram of an interaction apparatus according to an embodiment of the present disclosure.

Reference is made to FIG. 6, as an implementation of the methods described above, the present disclosure provides an embodiment of an interaction apparatus, the apparatus embodiment corresponds to the method embodiment shown in FIG. 1, and the apparatus may specifically be used in various electronic devices.

As shown in FIG. 6, the interaction apparatus in this embodiment includes a determining unit 601 and a transforming unit 602. The determining unit is configured to determine, in response to detecting a predefined size transformation operation, target transformation information of a target video based on whether a current size of the target video is a preset anchor point size, where the target video is a video played in a video play area. The transforming unit configured to transform the target video based on the target transformation information, and play the transformed target video In this embodiment, the specific processing of the determining unit 601 and the transforming unit 602 of the interaction apparatus and the technical effects brought by the units may refer to the relevant descriptions of steps 101 and 102 in the corresponding embodiment of FIG. 1 respectively, which will is not repeated here.

In some embodiments, the preset anchor point size corresponds to an operation type and preset transformation information; and the determining, in response to detecting a predefined size transformation operation, target transformation information of a target video based on whether a current size of the target video is a preset anchor point size includes: determining, in response to determining that the current size is the preset anchor point size and in response to the operation type of the size transformation operation corresponding to the preset anchor point size, the preset transformation information corresponding to the preset anchor point size as the target transformation information.

In some embodiments, the size transformation operation includes an enlarging operation, the preset anchor point size includes an original image size, and preset transformation information corresponding to the original image size indicates a full-screen image size, an operation type corresponding to the original image size is the enlarging operation; and the determining, in response to determining that the current size is the preset anchor point size and in response to the operation type of the size transformation operation corresponding to the preset anchor point size, the preset transformation information corresponding to the preset anchor point size as the target transformation information includes: determining, in response to determining that the current size is the original image size and in response to detecting the enlarging operation, the preset transformation information indicating the full-screen image size as the target transformation information.

In some embodiments, the size transformation operation includes a narrowing operation, the preset anchor point size includes a full-screen image size, and preset transformation information corresponding to the full-screen image size indicates an original image size, an operation type corresponding to the full-screen image size is the narrowing operation; and the determining, in response to determining that the current size is the preset anchor point size and in response to the operation type of the size transformation operation corresponding to the preset anchor point size, the preset transformation information corresponding to the preset anchor point size as the target transformation information includes: determining, in response to determining that the current size is the full-screen image size and in response to detecting the narrowing operation, the preset transformation information indicating the original image size as the target transformation information.

In some embodiments, the determining, in response to detecting a predefined size transformation operation in the video play area, target transformation information of a target video based on whether a current size of the target video is a preset anchor point size includes: entering, in response to detecting the size transformation operation and in response to satisfying a preset free-scaling condition, a free-scaling mode; and determining, in response to determining to enter the free-scaling mode, the target transformation information based on transformation information indicated by the size transformation operation and the current size of the target video.

In some embodiments, the free-scaling condition includes at least one of: a case that the current size of the target video is not the preset anchor point size; and a case that an operation type of the size transformation operation does not correspond to the preset anchor point size.

In some embodiments, the free-scaling condition comprises a case that the current size of the target video is the preset anchor point size, and an operation type do not correspond to the preset anchor point size, wherein the operation type is indicated by the ratio of a real-time size of the target video when a size transformation operation is released to the current size of the target video.

In some embodiments, before the size transformation operation is released, a size of the target video is transformed in real time based on the transformation information indicated by the size transformation operation.

In some embodiments, the apparatus is further configured to: display, in response to determining that a size of the transformed target video is not an original image size, a restore control, where the restore control is used for transforming the target video to the original image size.

In some embodiments, the apparatus is further configured to: move, in response to detecting a predefined moving operation and in response to determining that the current size of the target video is greater than a size of the video play area, the target video in the video play area.

In some embodiments, the apparatus is further configured to: detect, in response to the end of the size transformation operation and/or a moving operation, whether the target video is moved out of the video play area; and correct, in response to determining that the target video is moved out of the video play area, a video picture in the video play area.

In some embodiments, the apparatus is further configured to: package a first layer into a second layer, where a layer corresponding to a player is the first layer, and a target video in the second layer has the same play progress as a target video in the first layer, the target video in the second layer is used for transformation based on the size transformation operation and/or a moving operation.

In some embodiments, the target video in the second layer is transformed by: determining a transformation coefficient based on operation position information of the size transformation operation and/or the moving operation, where the transformation coefficient includes at least one of size transformation information and a moving coefficient; and transforming the target video in the second layer based on the transformation coefficient.

In some embodiments, the apparatus is further configured to: acquire a target video picture that matches the video play area from the target video in the second layer; and play the target video picture that matches the video play area in the video play area.

In some embodiments, the determining target transformation information of a target video based on whether a current size of the target video is a preset anchor point size includes: determining the target transformation information based on an operation type of the size transformation operation and the preset anchor point size.

In some embodiments, the determining the target transformation information based on an operation type of the size transformation operation and the preset anchor point size includes: using first target transformation information in response to the operation type and the preset anchor point size satisfying a first preset relationship, where the first target transformation information indicates that the size of the target video is switched between different preset anchor point sizes; and using second target transformation information in response to the operation type and the preset anchor point size satisfying a second preset relationship, where the second target transformation information corresponds to a free-scaling mode.

In some embodiments, the first preset relationship indicates that the operation type, the current size of the target video and the preset anchor point size satisfy a preset first correspondence or do not satisfy a preset second correspondence; and the second preset relationship indicates that the operation type, the current size of the target video and the preset anchor point size do not satisfy the preset first correspondence or satisfy the preset second correspondence.

In some embodiments, the first preset relationship includes a case that the current size of the target video is an original image size, the operation type is an enlarging operation, and the target transformation information includes transforming the target video to a full-screen image size; and/or, a case that the current size of the target video is the full-screen image size, the operation type is a narrowing operation, and the target transformation information includes transforming the target video to the original image size; and/or the second preset relationship includes a case that the current size of the target video is the original image size, the operation type is the narrowing operation, and the target transformation information includes freely scaling the target video based on operation information; and/or, a case that the current size of the target video is the full-screen image size, the operation type is the enlarging operation, and the target transformation information includes freely scaling the target video based on the operation information.

Figure 7:
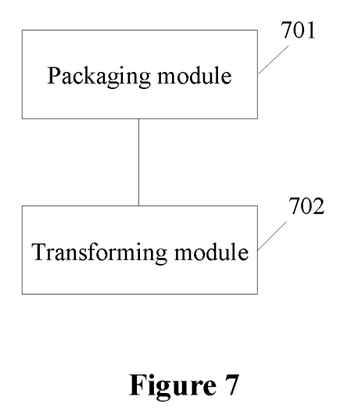
FIG. 7 is a schematic structural diagram of an interaction apparatus according to another embodiment of the present disclosure.

Reference is made to FIG. 7, as an implementation of the methods described above, the present disclosure provides an embodiment of an video transformation apparatus, the apparatus embodiment corresponds to the method embodiment shown in FIG. 5, and the apparatus may specifically be used in various electronic devices.

As shown in FIG. 7, the apparatus in this embodiment includes a packaging module 701 and a transforming module 702. The packaging module is configured to package a first layer into a second layer, where a target video in the second layer has the same play progress as a target video in the first layer, and a layer corresponding to a player is the first layer. The transforming module is configured to transform the target video in the second layer based on a predefined transformation operation.

In this embodiment, the specific processing of the packaging module 701 and the transforming module 702 of the apparatus and the technical effects brought by the units may refer to the relevant descriptions of steps 501 and 502 in the corresponding embodiment of FIG. 5 respectively, which will is not repeated here.

In some embodiments, the packaging module 701 may be configured to: determine a transformation coefficient based on operation position information of the predefined transformation operation, where the transformation coefficient includes at least one of size transformation information and a moving coefficient; and transform the target video in the second layer based on the size transformation information and the moving coefficient.

In some embodiments, the above apparatus is further configured to: acquire a target video picture that matches the video play area from the target video in the second layer; and play the target video picture that matches the video play area in the video play area.

In some embodiments, the layer corresponding to the player is the first layer to isolate video play from video transformation.

Figure 8:
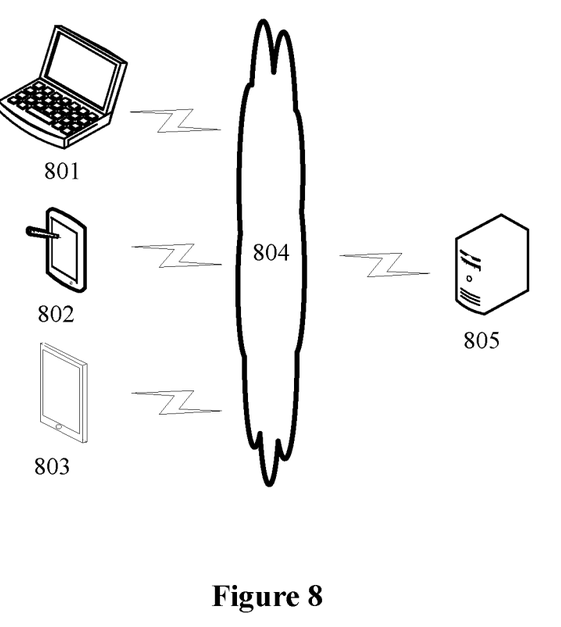
FIG. 8 is an exemplary system architecture to which an interaction method according to an embodiment of the present disclosure may be applied.

Reference is made to FIG. 8, which is an exemplary system architecture to which an interaction method according to an embodiment of the present disclosure may be applied.

Reference is made to FIG. 8, which is an exemplary system architecture to which an information process method according to an embodiment of the present disclosure may be applied.

As shown in FIG. 8, the system architecture may include terminal devices 801, 802, and 803, a network 804, and a server 805. The network 804 is a medium used to provide a communication link between the terminal devices 801, 802, 803 and the server 805. The network 804 may include various connection types, such as wired, wireless communication links, or fiber optic cables.

The terminal devices 801, 802, and 803 may interact with the server 805 through the network 804 to receive or send messages and the like. Various client applications, such as web browser applications, search applications, and news information applications, may be installed on the terminal devices 801, 802 and 803. The client applications in the terminal devices 801, 802, and 803 may receive the user's instruction, and complete corresponding functions according to the user's instruction, such as adding corresponding information to the information according to the user's instruction.

The terminal devices 801, 802, and 803 may be hardware or software. When the terminal devices 801, 802, and 803 are hardware, they may be various electronic devices that have a display screen and support web browsing, including but not limited to smart phones, tablet computers, e-book readers, MP3 players (Moving Picture Experts Group Audio Layer III), MP4 (Moving Picture Experts Group Audio Layer IV) players, laptops and desktops, etc. When the terminal devices 801, 802, and 803 are software, they may be installed in the electronic devices listed above. They may be implemented as multiple software or software modules (e.g., software or software modules for providing distributed services), or may be implemented as a single software or software module, which is not limited here.

The server 805 may be a server that can provide various services, such as receiving information acquiring requests sent by terminal devices 801, 802, and 803, acquiring display information corresponding to the information acquiring requests in various manners according to the information acquiring requests, and sending data related to the display information to the terminal devices 801, 1802, and 803.

It should be noted that the information processing method provided by the embodiment of the present disclosure may be executed by a terminal device, and correspondingly, an information process device may be arranged in the terminal devices 801, 802, and 803. In addition, the information processing method provided by the embodiment of the present disclosure may also be executed by the server 805, and accordingly, the information processing device may be arranged in the server 805.

It should be understood that the numbers of terminal devices, networks and servers in FIG. 8 are merely illustrative. There may be any number of terminal devices, networks and servers according to implementation requirements.

Figure 9:
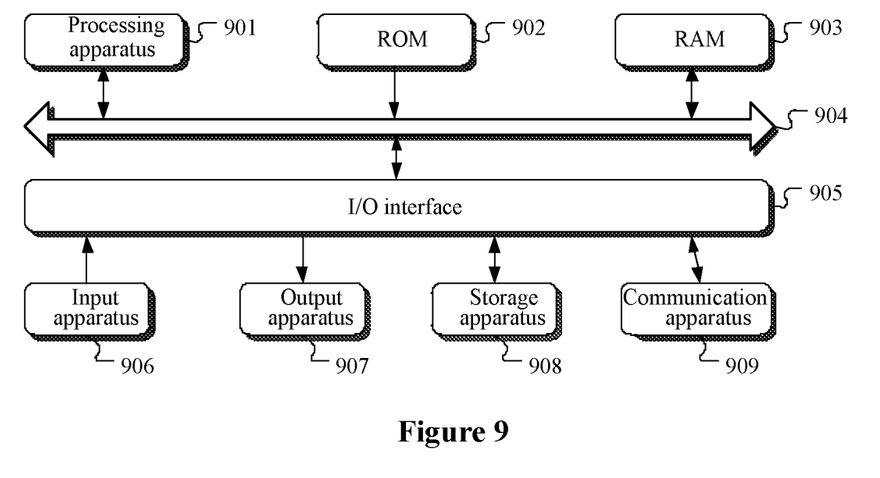
FIG. 9 a schematic diagram of a basic structure of an electronic device according to an embodiment of the present disclosure.

Reference is made to FIG. 9 which shows a schematic structural diagram of an electronic device (such as terminal devices or servers in FIG. 8) for implementing the embodiments of the present disclosure. The terminal device in the embodiments of the present disclosure may include but not limited to mobile terminals such as a mobile phone, a notebook computer, a digital broadcast receiver, a personal digital assistance (PDA), a tablet computer (PAD), a portable multi-media player (PMP) and a vehicle terminal (such as a vehicle navigation terminal); and fixed terminals such as a digital TV and a desktop computer. The electronic device shown in FIG. 9 is schematic, and is not intended to limit functions and scope of the embodiments of the present disclosure.

As shown in FIG. 9, the electronic device may include a processing apparatus (such as a central processor and a graphic processor) 901. The processing apparatus may perform various appropriate actions and processing by executing programs stored in a read-only memory (ROM) 902 or programs uploaded from a storage apparatus 908 to a random access memory (RAM) 903. Various programs and data required for operations of the electronic device 900 are also stored in the RAM 903. The processing apparatus 901, the ROM 902 and the RAM 903 are connected to each other through the bus 904. An input/output (I/O) interface 9011 is also connected to the bus 904.

Generally, the following components are connected to the I/O interface 905: an input apparatus 909 such as a touch screen, a touch panel, a keyboard, a mouse, a camera, a microphone, an accelerometer, and gyroscope; an output apparatus 907 such as a liquid crystal display (LCD), a loudspeaker and a vibrator; a storage apparatus 908 such as a magnetic tape and a hard disk; and a communication apparatus 909. The communication apparatus 909 may allow the electronic device to communicate with other device in a wired or wireless manner to exchange data. Although FIG. 9 shows the electronic device provided with various apparatuses, it should be understood that not all shown apparatuses are necessary. Alternatively, more or less apparatuses may be included.

According to the embodiments of the present disclosure, a process described in the flowchart may be implemented by computer software programs. For example, according to an embodiment of the present disclosure, a computer program product including computer program carried on a non-transient computer readable medium is provided. The computer program includes program codes for performing the method shown in the flowchart. In such embodiment, the computer program may be downloaded and installed from the network through the communication apparatus 909, installed from the storage apparatus 908 or installed from the ROM 902. The computer program is executed by the processing apparatus 901 to perform functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The computer readable storage medium may be included in the electronic device, or the computer readable storage medium may be independent from the electronic device, i.e., not being installed in the electronic device.

The computer readable medium carries one or more programs. The one or more programs, when executed by the electronic device, cause the electronic device to: determine, in response to detecting a predefined size transformation operation, target transformation information of a target video based on whether a current size of the target video is a preset anchor point size, where the target video is a video played in a video play area; and transform the target video based on the target transformation information, and play the transformed target video.

The above-mentioned computer readable medium carries one or more programs, and when the above-mentioned one or more programs, when executed by the electronic device, cause the electronic device to: package a first layer into a second layer, where a target video in the second layer has the same play progress as a target video in the first layer, and a layer corresponding to a player is the first layer; and transform the target video in the second layer based on a predefined transformation operation.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Units involved in the embodiments of the present disclosure may be implemented by software or hardware. Names of the units do not limit the units in a certain case. For example, the transformation unit may also be described as "a unit for playing the target video".

The functions described above may be partially performed by one or more hardware logic components. For example, non-restrictively, exemplary types of hardware logic components that may be used include: a field programmable gate array (FPGA), an application specific integrated circuit (ASIC), an application specific standard product (ASSP), a system on chip (SOC), a complex programmable logic device (CPLD) and so on.

In the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

Although the operations are described in a specific order, the operations are unnecessarily to be performed in the specific order or in a chronological order. In a certain environment, a multi-task and parallel processing may be beneficial. Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The subject matter is described by language specific to the structure feature and/or method logic, it should be understood that the subject matter defined in the appended claims is not limited to the specific features or actions described above. The specific features and actions are only schematic implementation of the claims.

The invention claimed is:

1. An interaction method, comprising:
    displaying a video;
    determining, in response to receiving an input performed on the video, whether a first scaling mode is applicable to the video based on a current size of the video being displayed, preset anchor point sizes, and preset types of size transformation operations corresponding to the preset anchor point sizes;
    in response to determining that the first scaling mode is applicable to the video, transforming a display size of the video from one of the preset anchor point sizes to another different preset anchor point size; and
    in response to determining that the first scaling mode is not applicable to the video, entering a second scaling mode, wherein the second scaling mode is a free scaling mode in which the display size of the video is transformed based on received instruction.

2. The method according to claim 1, wherein the preset anchor point sizes comprise an original display size and a full-screen display size.

3. The method according to claim 1, further comprising:
    in response to entering the free scaling mode, transforming the display size of the video to a size indicated by the received instruction, based on change of the touch position corresponding to the received instruction.

4. The method according to claim 1, wherein a type of the received instruction is determined based on a ratio of a real-time size of the target video when a size transformation operation is released to the current size of the target video.

5. The method according to claim 4, wherein before the size transformation operation is released, a size of the target video is transformed in real time based on the transformation information indicated by the size transformation operation.

6. The method according to claim 1, further comprising:
displaying, in response to determining that a size of the transformed target video is not an original display size, a restore control, wherein the restore control is used for transforming the target video to the original display size.

7. The method according to claim 1, further comprising:
moving, in response to detecting a predefined moving operation and in response to determining that the current size of the target video is greater than a size of the video play area, the target video in the video play area.

8. The method according to claim 1, further comprising:
detecting, in response to the end of the received instruction and/or a moving operation, whether the target video is moved out of the video play area; and
correcting, in response to determining that the target video is moved out of the video play area, a video picture in the video play area.

9. The method according to claim 1, further comprising:
packaging a first layer into a second layer, wherein a layer corresponding to a player is the first layer, and a target video in the second layer has the same play progress as a target video in the first layer, the target video in the second layer is used for transformation based on the size transformation operation and/or a moving operation.

10. The method according to claim 9, wherein the target video in the second layer is transformed by:
determining a transformation coefficient based on at least one of: position information indicated by the received instruction, the moving operation; wherein the transformation coefficient comprises at least one of: size transformation information, a moving coefficient; and
transforming the target video in the second layer based on the transformation coefficient.

11. The method according to claim 10, further comprising:
acquiring a target video picture that matches the video play area from the target video in the second layer; and
playing the target video picture that matches the video play area in the video play area.

12. An electronic device comprising:
one or more processors;
a storage device storing one or more programs, the one or more programs, when executed by the one or more processors, causing the one or more processors to:
display a video;
determine, in response to receiving an input performed on the video, whether a first scaling mode is applicable to the video based on a current size of the video being displayed, preset anchor point sizes, and preset types of size transformation operations corresponding to the preset anchor point sizes;
in response to determining that the first scaling mode is applicable to the video, transforming a display size of the video from one of the preset anchor point sizes to another different preset anchor point size; and
in response to determining that the first scaling mode is not applicable to the video, entering a second scaling mode, wherein the second scaling mode is a free scaling mode in which the display size of the video is transformed based on received instruction.

13. The device of claim 12, wherein the preset anchor point sizes comprise an original display size and a full-screen display size.

14. The device of claim 12, the at least one memory further storing instructions that upon execution by the at least one processor cause the device to:
in response to entering the free scaling mode, transform the display size of the video to a size indicated by the received instruction, based on change of the touch position corresponding to the received instruction.

15. The device of claim 14, wherein a type of the received instruction is determined based on a ratio of a real-time size of the target video when a size transformation operation is released to the current size of the target video.

16. The device of claim 15, wherein before the size transformation operation is released, a size of the target video is transformed in real time based on the transformation information indicated by the size transformation operation.

17. The device of claim 12, the at least one memory further storing instructions that upon execution by the at least one processor cause the device to:
display, in response to determining that a size of the transformed target video is not an original display size, a restore control, wherein the restore control is used for transforming the target video to the original display size.

18. The device of claim 12, the at least one memory further storing instructions that upon execution by the at least one processor cause the device to:
move, in response to detecting a predefined moving operation and in response to determining that the current size of the target video is greater than a size of the video play area, the target video in the video play area.

19. The device of claim 12, the at least one memory further storing instructions that upon execution by the at least one processor cause the device to:
detect, in response to the end of the received instruction and/or a moving operation, whether the target video is moved out of the video play area; and
correct, in response to determining that the target video is moved out of the video play area, a video picture in the video play area.

20. A computer readable non-transitory storage medium, bearing computer-readable instructions that upon execution on a computing device cause the computing device at least to:
display a video;
determine, in response to receiving an input performed on the video, whether a first scaling mode is applicable to the video based on a current size of the video being displayed, preset anchor point sizes, and preset types of size transformation operations corresponding to the preset anchor point sizes;
in response to determining that the first scaling mode is applicable to the video, transforming a display size of the video from one of the preset anchor point sizes to another different preset anchor point size; and
in response to determining that the first scaling mode is not applicable to the video, entering a second scaling mode, wherein the second scaling mode is a free scaling mode in which the display size of the video is transformed based on received instruction.

* * * * *